(12) United States Patent
Tong

(10) Patent No.: US 10,168,416 B1
(45) Date of Patent: Jan. 1, 2019

(54) APPARATUS, SYSTEM AND METHOD OF ESTIMATING AN ARRIVAL TIME OF A WIRELESS TRANSMISSION

(71) Applicant: SAMSUNG ELECTRONICS CO., LTD., Suwon-si, Gyeonggi-Do (KR)

(72) Inventor: Fei Tong, Bassingbourn (GB)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/857,921

(22) Filed: Dec. 29, 2017

(51) Int. Cl.
*H04W 24/00* (2009.01)
*G01S 5/06* (2006.01)
*H04W 64/00* (2009.01)

(52) U.S. Cl.
CPC .............. *G01S 5/06* (2013.01); *H04W 64/003* (2013.01)

(58) Field of Classification Search
CPC ...... G01S 5/06; H04W 64/03; H04L 43/0864; H04L 27/265; H04L 27/3872; H04B 1/0017
See application file for complete search history.

(56) References Cited

U.S. PATENT DOCUMENTS

| | | | | |
|---|---|---|---|---|
| 8,233,457 B1* | 7/2012 | Chen | ..................... | G01S 13/878 370/332 |
| 2005/0239432 A1* | 10/2005 | Wilcox | .............. | H04B 1/71637 455/334 |
| 2016/0277197 A1* | 9/2016 | Jose | ..................... | H04W 64/00 |
| 2017/0367065 A1* | 12/2017 | Seth | ..................... | H04W 64/003 |

* cited by examiner

*Primary Examiner* — Barry W Taylor
(74) *Attorney, Agent, or Firm* — F. Chau & Associates, LLC

(57) ABSTRACT

A method of determining a time of arrival (ToA) of a wireless transmission includes: sampling a signal received in a wireless transmission to generate first data in a time domain, performing a FFT on the first data to generate second data in a frequency domain, dividing the second data by a reference signal to obtain a channel frequency response, performing and IDFT on the channel frequency response to obtain a channel impulse response, determining a peak in the channel impulse response; and determining the ToA based on the peak.

17 Claims, 10 Drawing Sheets

APPARATUS, SYSTEM AND METHOD OF ESTIMATING AN ARRIVAL TIME OF A WIRELESS TRANSMISSION

BACKGROUND

1. Technical Field

Exemplary embodiments of the present inventive concept relate to estimating a location of a station.

2. Discussion of Related Art

Outdoor navigation is widely deployed thanks to the development of various global-navigation-satellite systems (GNSS), such as Global Positioning System (GPS). Recently, there has been a lot of focus on indoor navigation. This field differs from outdoor navigation since the indoor environment does not enable reception of signals from GNSS satellites. As a result, a lot of effort is being directed toward solving indoor navigation problems.

A current approach for indoor navigation includes a Time-of-Flight (ToF) measurement method. The ToF may be defined as the time it takes a signal to propagate from a first station, e.g., a user ("client") mobile device, to a second station, e.g., an access point (AP), and back to the first station. The ToF measurement method includes calculation of the time of arrival (ToA) of the signal. The TOF can then be used to estimate the distance between the stations. However, if the calculation of the ToA is not accurate, then the distance will also not be accurate.

Thus, there is a need for methods and systems that can more accurately estimate the ToA.

SUMMARY

According to an exemplary embodiment of the inventive concept, a method of determining a time of arrival (ToA) of a wireless transmission includes: sampling, by a station, a signal received in a wireless transmission to generate first data in a time domain; performing, by the station, a fast Fourier transform (FFT) on the first data to generate second data in a frequency domain; dividing, by the station, the second data by a pre-defined reference signal to obtain a discrete channel frequency response; performing, by the station, an inverse discrete Fourier transform (IDFT) on the discrete channel frequency response to obtain a discrete channel impulse response; determining, by the station, a peak in the discrete channel impulse response; and determining a time of arrival (ToA) based on the peak.

According to an exemplary embodiment of the inventive concept, a station is provided that is configured to determine a ToA from a wireless transmission. The station includes a receiver configured to wirelessly receive the wireless transmission and a sample a signal received in the wireless transmission to generate first data in a time domain, and a digital signal processor (DSP). The DSP is configured to perform a fast Fourier transformation (FFT) on the first data to generate second data in a frequency domain, divide the second data by a reference signal to obtain a discrete channel frequency response, perform an inverse discrete Fourier transform (IDFT) on the discrete channel frequency response to obtain a discrete channel impulse response, determine a peak in the discrete channel impulse response, and determine the ToA based on the peak.

According to an exemplary embodiment of the inventive concept, a method of determining a location of a station includes: wirelessly transmitting, by the station, a first message; calculating, by the station, a discrete channel frequency response from a second message wirelessly received in response to the first message; performing, by the station, an inverse discrete Fourier transform (IDFT) on the non-discrete channel frequency response to obtain a discrete channel impulse response; determining, by the station, a peak in the discrete impulse response; determining, by the station, a first time of arrival (ToA) based on the peak; and determining, by the station, the location based on the first ToA.

BRIEF DESCRIPTION OF THE DRAWINGS

The present inventive concept will become more apparent by describing in detail exemplary embodiments thereof with reference to the attached drawings, in which.

DETAILED DESCRIPTION

Figure 1:
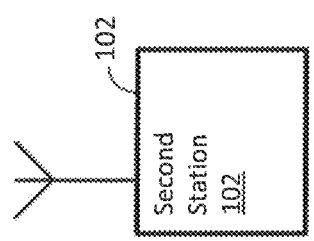
FIG. 1 illustrates an arrangement of wireless devices (e.g., stations) in accordance with an exemplary embodiment of the present inventive concept.
Figure 1:
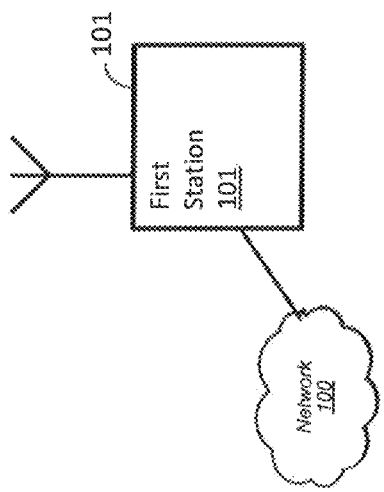

Hereinafter, exemplary embodiments of the inventive concept in conjunction with accompanying drawings will be described. Below, details, such as detailed configurations and structures, are provided to aid a reader in understanding embodiments of the inventive concept. Therefore, embodiments described herein may be variously changed or modified without departing from embodiments of the inventive concept.

Modules in the drawings or the following detailed description may be connected with other modules in addition to the components described in the detailed description or illustrated in the drawings. Each connection between the modules or components may be a connection by communication or may be a physical connection.

FIG. 1 illustrates an arrangement of wireless devices (e.g., stations) in accordance with an exemplary embodiment of the invention. The wireless devices include a first wireless device 101 and a second wireless device 102. The wireless devices 101 and 102 may communicate over a wireless transmission medium in such a manner as to form a wireless network. The wireless network may be an IEEE 802.11

'infrastructure mode' network provided by a dedicated access point (e.g., wireless device 101); alternatively, the wireless network may be an 'ad-hoc' or peer-to-peer based network. IEEE 802.11-refers to technology based on IEEE 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

One or more of the wireless devices may be equipped to communicate with one or more external networks. For example, as shown, the wireless device 101 may be communicatively coupled to network 100. The external network(s) may be any of a variety of types of networks, such as a cellular service provider's core network (e.g., via a cellular base station), the Internet, or an organization's intranet, among various possibilities.

One or more of the wireless devices 101-102 may be capable of communicating using multiple wireless communication standards. For example, one or more of the wireless devices 101-102 may be configured to communicate using at least one wireless networking protocol (e.g., Wi-Fi) and/or peer-to-peer wireless communication protocol (e.g., BT, Wi-Fi peer-to-peer, etc.) and at least one cellular communication protocol (e.g., GSM, UMTS. LTE, LTE-Advanced (LTE-A), 3GPP2 CDMA2000 (e.g., 1×RTF, 1×EV-DO, HRPD, cHRPD), etc.). Any or all of the wireless devices 101-102 may also or alternatively be configured to communicate using one or more global navigational satellite systems (GNSS. e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Any or all of the wireless devices 101-102 may be configured to perform any of the method embodiments described herein, or any portion of any of the method embodiments described herein.

Figure 2:
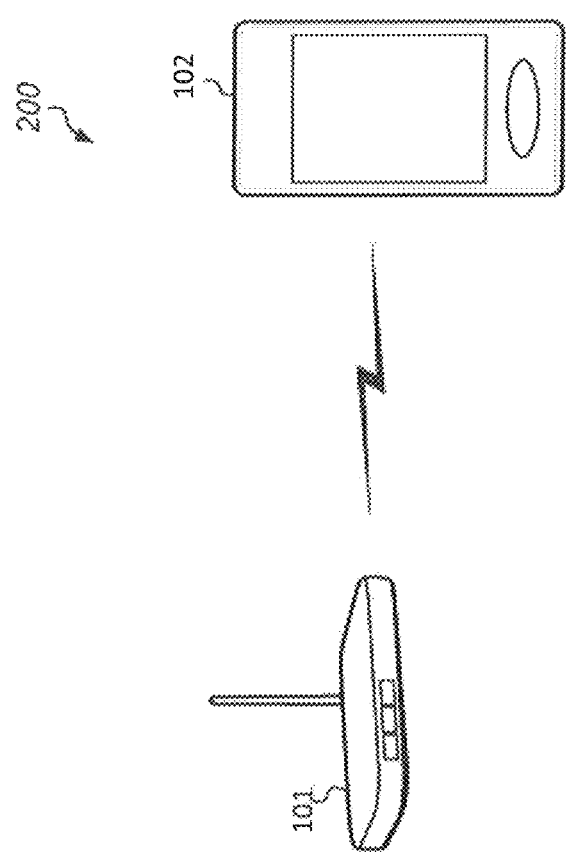
FIG. 2 illustrates an exemplary wireless communication system according to exemplary embodiment of the invention.

FIG. 2 illustrates an exemplary wireless communication system 200 in which aspects of the system 100 of FIG. 1 according to one possible implementation are represented, according to some embodiments. The second wireless device 102 may be a mobile station (also referred to as an "STA") and the first wireless device 101 may be an access point (also referred to as an "AP", or alternatively as a "base station" or "BS"). The STA 102 may be a user device with Wi-Fi communication capability such as a mobile phone, a hand-held device, a wearable device, a computer or a tablet, or virtually any type of wireless device. The AP 101 may be an access point device with Wi-Fi communication capability such as a wireless router or other wireless access point.

Either or both of the AP 101 and the STA 102 may include a processor that is configured to execute program instructions stored in memory. Either or both of the AP 101 and the STA 102 may perform any of the method embodiments described herein by executing such stored instructions. Alternatively. or in addition, a programmable hardware element such as an FPGA (field-programmable gate array) that is configured to perform any of the method embodiments described herein, or any portion of any of the method embodiments described herein, may be included as part of the AP 101 and/or the STA 102.

While FIG. 1 shows two stations, embodiments of the inventive concept are not limited thereto. For example, there may be more than two stations.

Figure 3:
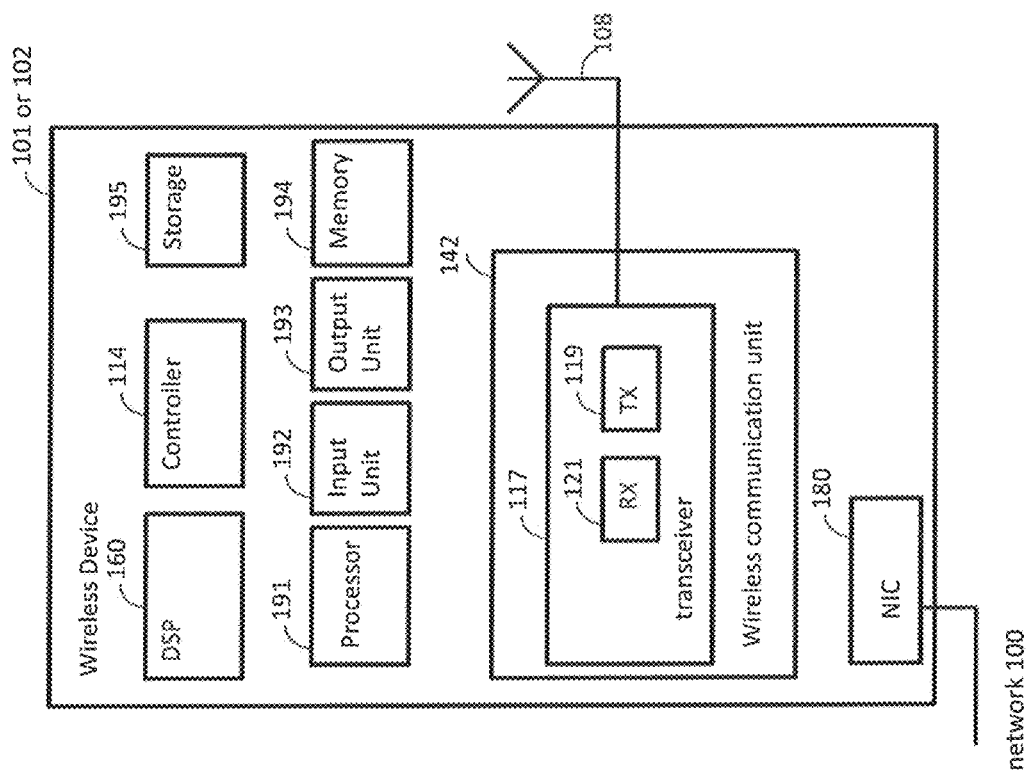
FIG. 3 illustrates a wireless device according to an exemplary embodiment of the inventive concept.

FIG. 3 is a block diagram illustrating either the first wireless device 101 or the second wireless device 102 of FIG. 1 according to an exemplary embodiment of the inventive concept.

Referring to FIG. 3, a wireless device (e.g., 101 or 102) may include one or more wireless communication devices capable of communicating content, data, information and/or signals via a wireless channel or wireless medium.

In exemplary embodiments, any one of the wireless devices (e.g., 101 or 102) may be, for example, a personal computer (PC), a desktop computer, a mobile computer, a laptop computer, a notebook computer, a tablet computer, an Ultrabook computer, a mobile internet device (MID), a server computer, a handheld computer, a handheld device, a personal data assistant (PDA) device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a personal communication service (PCS) device, a PDA device which incorporates a wireless communication device, a mobile or portable GPS device, a digital video broadcasting (DVB) device, a relatively small computing device, a non-desktop computer, a context-aware device, a video device, an audio device, an A/V device, a Set-Top-Box (STB), a video source, an audio source, a video sink, an audio sink, a stereo tuner, a broadcast radio receiver, a flat panel display, a Personal Media Player (PMP), a data source, a data sink, User Equipment (UE), a "Carry Small Live Large" (CSLL) device, an Ultra Mobile Device (UMD), an Ultra Mobile PC (UMPC), a device that supports Dynamically Composable Computing (DCC), a wimeless tag, a tracker device, a video device, an audio device, an A/V device, a gaming device, a media player, a Smartphone, an Internet of Things (IOT) device, smart appliances connected to an IOT device, or items under inventory control (or being tracked) by wireless means.

In an exemplary embodiment, a wireless device (e.g., 101 or 102) may include wireless communication units, to perform wireless communication with another wireless device (101 or 102) over a wireless channel. For example, a wireless device (e.g., 101 or 102) may include a wireless communication unit 142.

In an exemplary embodiment, the wireless communication unit 142 may include one or more radios. For example, the wireless communication unit 142 may include a transceiver 117, e.g., including one or more wireless transmitters, receivers and/or transceivers able to send and/or receive wireless communication signals, RF signals, frames, blocks, transmission streams, packets, messages, data items, and/or data. In one example, the radios may include modulation elements, demodulation elements, amplifiers, analog to digital and digital to analog converters, or filters. In one example, transceiver 117 may include at least one transmitter (Tx) 119 and at least one receiver (Rx) 121. For example, the wireless communication unit 142 may include or may be implemented as part of a wireless Network Interface Card (NIC). In exemplary embodiments, one or more of the illustrated components of FIG. 3 may be omitted, or include additional components may be added. In an embodiment, the wireless device (e.g., 101 or 102) further includes wired NIC or network interface device 180 to communicate with a wired network.

In exemplary embodiments, the wireless communication units may include, or may be associated with, one or more antennas. For example, the wireless communication unit 142 may be associated with an antenna 108.

The antenna 108 may include any type of antenna suitable for transmitting and/or receiving wireless communication signals, blocks, frames, transmission streams, packets, messages and/or data. For example, antenna 108 may include any suitable configuration, structure and/or arrangement of one or more antenna elements, components, units, assemblies and/or arrays. Antenna 108 may include, for example, antennas suitable for directional communication, e.g., using beamforming techniques. For example, antenna 108 may include a phased array antenna, a multiple element antenna, a set of switched beam antennas, and/or the like. In some embodiments, antenna 108 may implement transmit and receive functionalities using separate transmit and receive antenna elements. In some embodiments, antenna 108 may implement transmit and receive functionalities using common and/or integrated transmit/receive elements.

In exemplary embodiment, a wireless device (e.g., 101 or 102) may also include, for example, a processor 191, an input unit 192, an output unit 193, a memory unit 194, and a storage unit 195. A wireless device may optionally include other suitable hardware components and/or software components. In exemplary embodiments, some or all of the components of a wireless device are enclosed in a common housing or packaging, and may be interconnected or operably associated using one or more wired or wireless links. In other embodiments, components of the wireless device may be distributed among multiple or separate devices.

The processor 191 includes, for example, a Central Processing Unit (CPU), a Digital Signal Processor (DSP), one or more processor cores, a single-core processor, a dual-cor processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, the processor 191 executes instructions, for example, of an Operating System (OS) of the wireless device and/or of one or more suitable applications.

The memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by mobile device 120.

The input unit 192 includes, for example, a keyboard, a keypad, a mouse, a touch-screen, a touch-pad, a track-ball, a stylus, a microphone, or other suitable pointing device or input device. The output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

The wireless device (e.g., 101 or 102) may further include a digital signal processor (DSP) 160 to perform one or more calculations in methods of the inventive concept. The DSP 160 may include a correlator, which is circuitry, a processor, or a controller configured to perform a cross-correlation on an incoming signal received from a transmitter and a known signal associated with the transmitter. In an embodiment, the DSP 160 is located within the transceiver 142.

Figure 4:
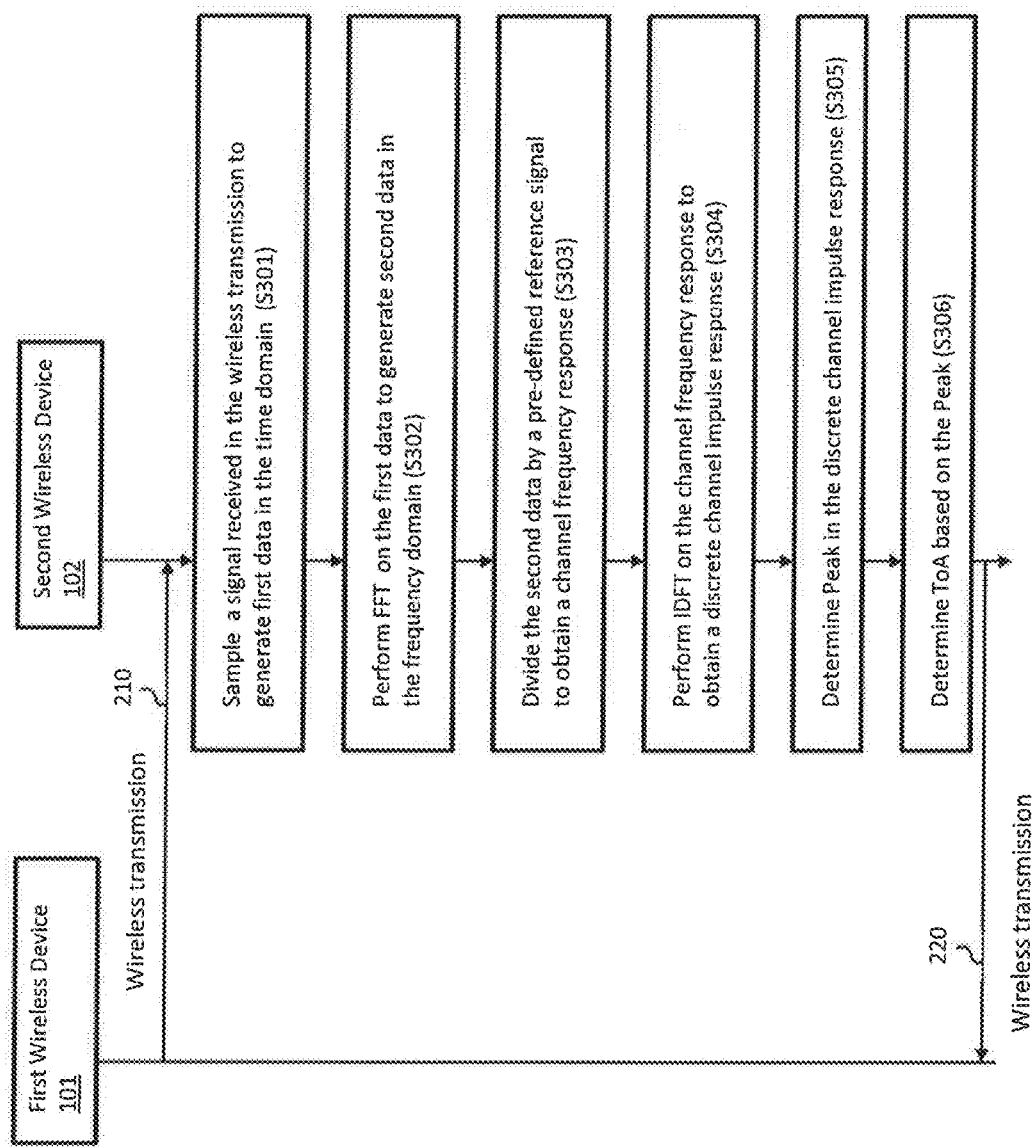
FIG. 4 illustrates a method of determining a time of arrival of a signal sent from a first station to a second station according to an exemplary embodiment of the inventive concept.

FIG. 4 illustrates a method of determining a time of arrival of a signal sent from a first station to a second station according to an exemplary embodiment of the inventive concept. The method includes a first station (e.g., 101) performing a wireless transmission 210 (e.g., wireless transmission of a message). The wireless transmission 210 may include a physical layer (PHY) preamble and signaling information as well as PHY data. The PHY data may include encapsulated higher layer data for any of various possible networking, application, and/or other protocol stack layers, for example depending on the communication standard(s) and/or technologies in conjunction with which the first wireless transmission is being performed. The transmitter 119 may be used to perform the wireless transmission 210.

The PHY preamble may include any or all of a legacy short training field (L-STF), a legacy long training field (L-LTF), a legacy signal field (L-SIG), one or more 'high throughput' (HT) and/or 'very high throughput' (VHT) short training fields, long training fields, and/or signal fields, depending on the version (e.g., 802.11n, 802.11ac, etc.) of the Wi-Fi transmission.

The method next includes the second wireless device (e.g., 102) sampling a signal received in the wireless transmission (e.g., 210) to generate first data in the time domain (S301). In an embodiment, the signal is an L-LTF signal representing an L-LTF that is present in the wireless transmission 210. The receipt and sampling of the signal may be performed by the receiver 121.

The method then includes performing a fast Fourier transform (FFT) on the first data to generate second data $Y_f(m)$ in the frequency domain (S302). The FFT may be performed by the DSP 160. The second data $Y_f(m)$ (i.e., the FFT output of the L-LTF) may be represented by Equation 1 as follows:

$$Y_f(m)=H_f(m)\cdot S(m)+\eta(m) \qquad \text{[Equation 1]}.$$

In Equation 1, $H_f(m)$ is the channel frequency response, $S(m)$ is an L-LTF reference signal, and $\eta(m)$ is a noise term on the $m^{th}$ sub-carrier, where m is $>=1$. In an embodiment, the noise term $\eta(m)$ is omitted.

The method further includes dividing the second data by a pre-defined reference signal to obtain a (e.g., discrete) channel frequency response (S303). The dividing may be performed by the DSP 160. The channel frequency response $H_f(m)$ may be estimated by assuming the noise term $\eta(m)$ is 0 so that the channel frequency response $H_f(m)$ can be derived by dividing the second data $Y_f(m)$ by the L-LTF reference signal $S(m)$ as shown in Equation 2 as follows:

$$H_f(m)=Y_f(m)/S(m) \qquad \text{[Equation 2]}.$$

The memory 194 may store data representing the L-LTF reference signal. The L-LTF reference signal may be the same as or substantially the same as the L-LTF in the transmission signal 210. The dividing may also be referred to as performing a de-rotate or de-rotation on the L-LTF reference signal $S(m)$.

Figure 5:
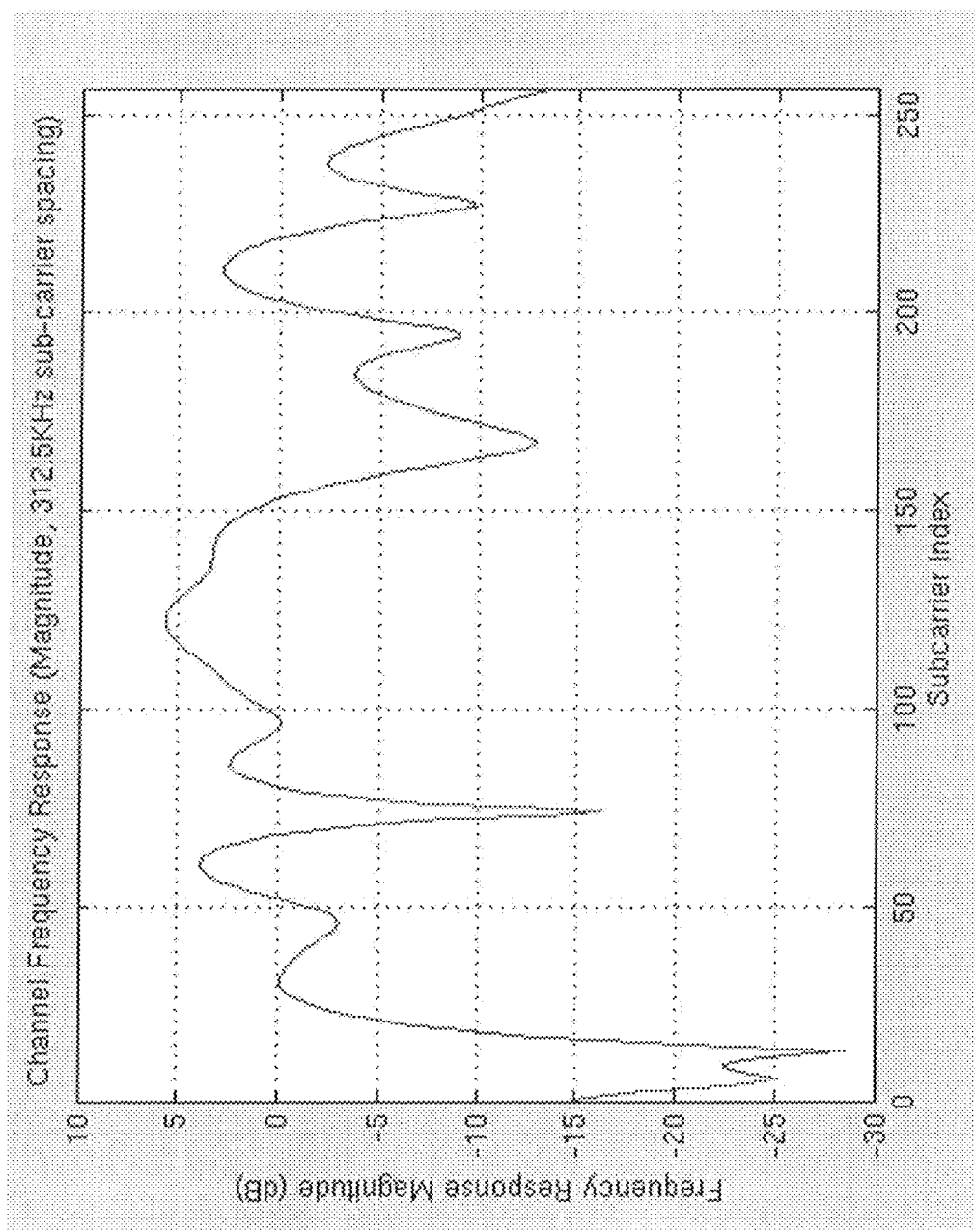
FIG. 5 illustrates an example of a channel frequency response.

FIG. 5 illustrates an example of the channel frequency response $H_f(m)$ as a plot of the magnitude of the frequency response verses subcarrier indexes. While FIG. 5 illustrates 312.5 KHz subcarrier spacing, the inventive concept is not limited thereto.

Referring back to FIG. 4, the method further includes performing an inverse discrete Fourier transform (IDFT) on the channel frequency response to obtain a discrete channel impulse response (S304). The channel frequency response is in the frequency domain while the channel impulse response is in the time domain. The DSP 160 may perform the IDFT. The below Equation 3 represents the discrete channel frequency response, where P is an iteration index and $2^P N$ represents the IDFT size, where P and N are >=1. The parameter N is the number of samples of the channel frequency response.

$$h_{2^P N}(n) = \sum_{m=-N/2}^{N/2-1} H_f(m) e^{-j\frac{2\pi}{2^P N} mn} \qquad [\text{Equation 3}]$$

The IDFF size for an IDFT is normally N, but for this embodiment of the inventive concept, the IDFT size has been increased from N to $2^P N$ so the channel impulse response can be sampled with finer resolution (e.g., ×2).

The method then includes determining a Peak in the discrete channel impulse response (S305). The determining of the Peak may be performed using the DSP 160. In an embodiment, the determining of the Peak includes searching for a local peak in the discrete channel impulse response of $2^P N$ samples. One can obtain the position of the local peak with sub-sample clock resolution. Taking a 20 Msps sampling rate as an example, four times oversampling can give 12.5 ns resolution, which requires P=2. In an embodiment of the inventive concept, the complexity of the search can be reduced by focusing in the local region where the peak is located. Therefore, one does not need to perform a full sized IDFF since we are only interested in $h_{2^P N}(n)$, $n \in \mathcal{P}$, where $\mathcal{P}$ is the set of sample positions around the Peak region.

In an embodiment of the inventive concept, a bi-sect search is used to obtain the set of sample positions $\mathcal{P}$. 1) The search is performed on the output of a full sized IDFT of size N and is a N sample full search. During the search, the peak and two adjacent samples (on each side of the peak) are compared. The peak search may be performed on a cross-correlation on the LTF part of the received message. The result of the cross-correlation can be represented by Equation 4 as follows:

$$C_{ltf}(k) = \sum_{i=0}^{N} r(i+T+k) \cdot S_{ltf}^*(i), k \in [-N, N]. \qquad [\text{Equation 4}]$$

In Equation 4, $S_{ltf}^*(i)$ is a conjugated time domain signal of the frequency domain reference L-LTF signal S(m).

2) Then, out of three samples, the samples with the two highest amplitude (for instance, $p_1(N), p_2(N)$, where $p_1(N)$ is the index in an IDFT size of N) are picked for interpolation. The interpolation is to calculate the sample position in between $p_1(N)$ and $p_2(N)$, which is the sample $p_3(2N)=2p_1(2N)+1$, and the IDFT result for $p_3(2N)$ can be expressed by Equation 5 as follows:

$$h_{2N}(p_3) = \sum_{m=-N/2}^{N/2-1} H_f(m) e^{-j\frac{2\pi}{2N} mp_3}. \qquad [\text{Equation 5}]$$

Then three IDFT samples (two existing ones are $h_{2N}(2p_1)=h_N(p_1)$ and $h_{2N}(2p_2)=h_N(p_2)$) are $h_N(p_1)$ $h_{2N}(p_3)$, $h_N(p_2)$.

Then the two highest samples are picked up for the next search. The search will terminate when the peak strength stops increasing (with a predefined step lower threshold) or a maximal number of iterations have reached. This may be referred to as an IDFT based bi-sect search method.

The IDFF based bi-sect search method can reduce complexity to $N(\log_2 N+P)$. This complexity can be further reduced if a fast single point IDFT algorithm can be used.

Figure 6:
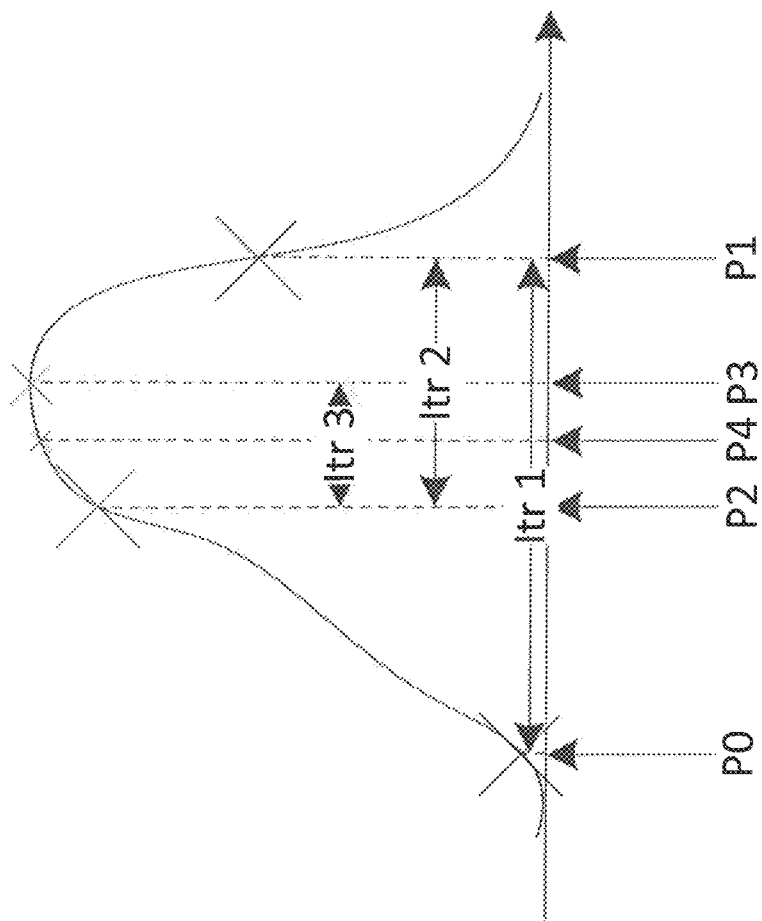
FIG. 6 illustrates an inverse discrete Fourier transform (IDFT) based bi-section method according to an exemplary embodiment of the inventive concept.

FIG. 6 illustrates the IDFT based bi-sect search method. For example, FIG. 6 illustrates a channel impulse response magnitude with a series of search iterations and their samples positions in the channel impulse response.

Once the peak is determined, the method includes determining a time of arrival (TOA) based on the peak (S306). The DSP 160 may be used to determine the TOA.

A time of flight (TOF) can be determined from the first departure time of the first wireless transmission 210, the first TOA of the first wireless transmission 210 calculated by the second station 102, a second departure time of a second wireless transmission 220 from the second station 102 to the first station 101, and a second arrival time of the second wireless transmission 220. In an embodiment, the second station 102 is configured to respond to the first wireless transmission 210 with the second wireless transmission 220. The distance between the first station 101 and the second station 102 can be determined from the TOF.

The first station 101 can determine the second arrival time of the second wireless transmission 220 by performing steps S301-S306 on the second wireless transmission 220. The first wireless station 101 may have recorded a time at which the first wireless transmission 210 was sent to the second station 102 as the first departure time of the first wireless transmission 210. The second wireless station 102 may have recorded a time at which the second wireless transmission 220 was sent as the second departure time. In an exemplary embodiment, the second station embeds the second departure time in the second wireless transmission 220 so the first station can determine the TOF. Once the TOF has been determined, the first station can estimate its distance from the second station. Assuming the first station has knowledge of its location, the first station can determine the location of the second station from its location and several distances between the first and the second station at different reference points.

The arrival time (e.g., the first arrival time calculated from the first wireless transmission 210) may be proportional to the distance between a first sample P0 of the discrete channel impulse response and the sample of the discrete channel impulse response with the highest peak (e.g., P3).

Figure 7:
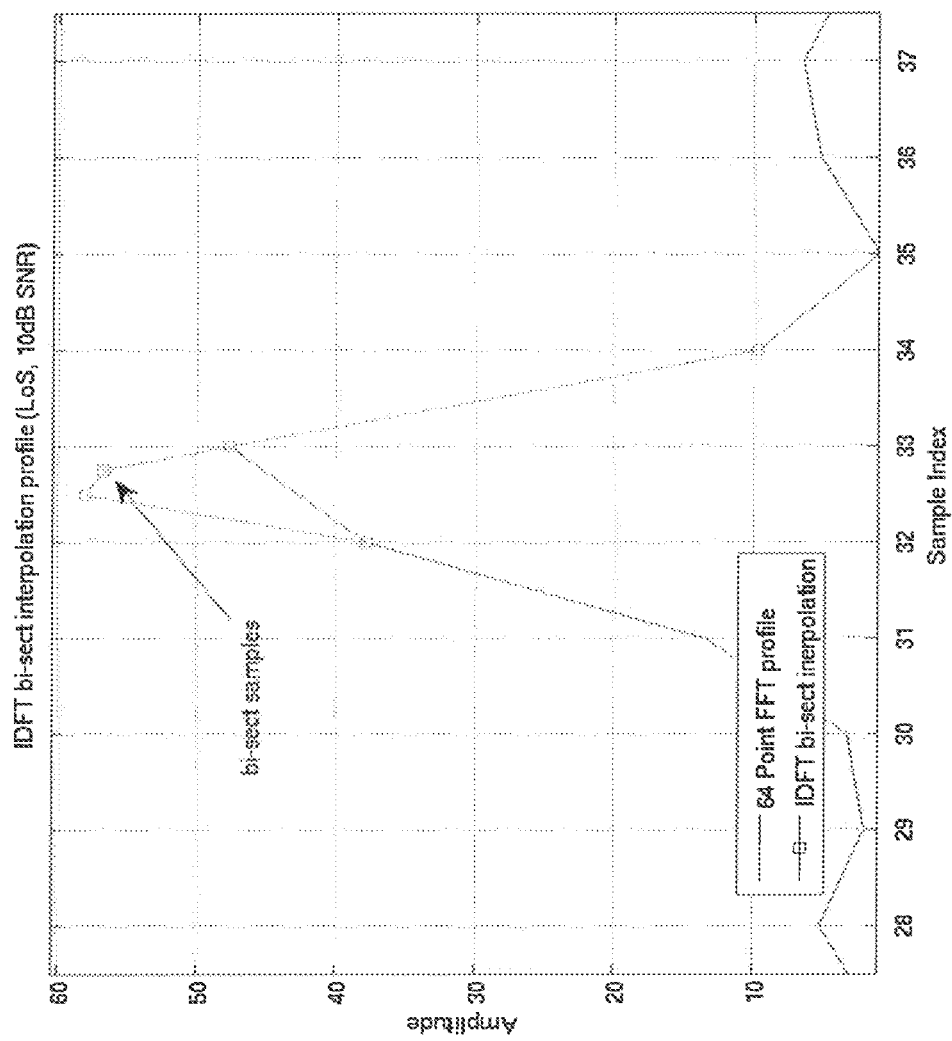
FIG. 7 illustrates an example of an IDFT bi-section interpolation profile.
Figure 8:
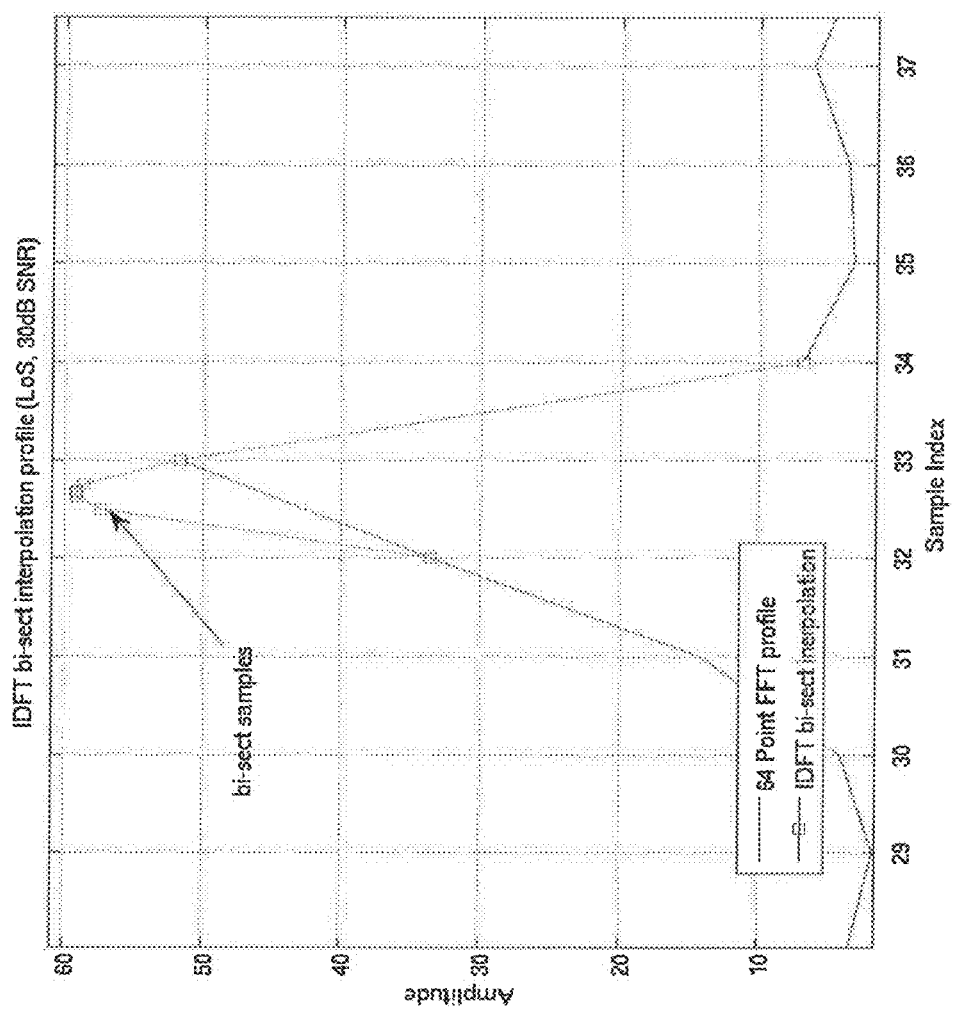
FIG. 8 illustrates an example of an IDFT bi-section interpolation profile.

FIG. 7 illustrates a real profile (e.g., an IDFT bi-section interpolation profile) obtained from a simulation with 10 dB signal to noise ratio (SNR) and FIG. 8 illustrates a real profile obtained from a simulation with 30 db of SNR.

Figure 9:
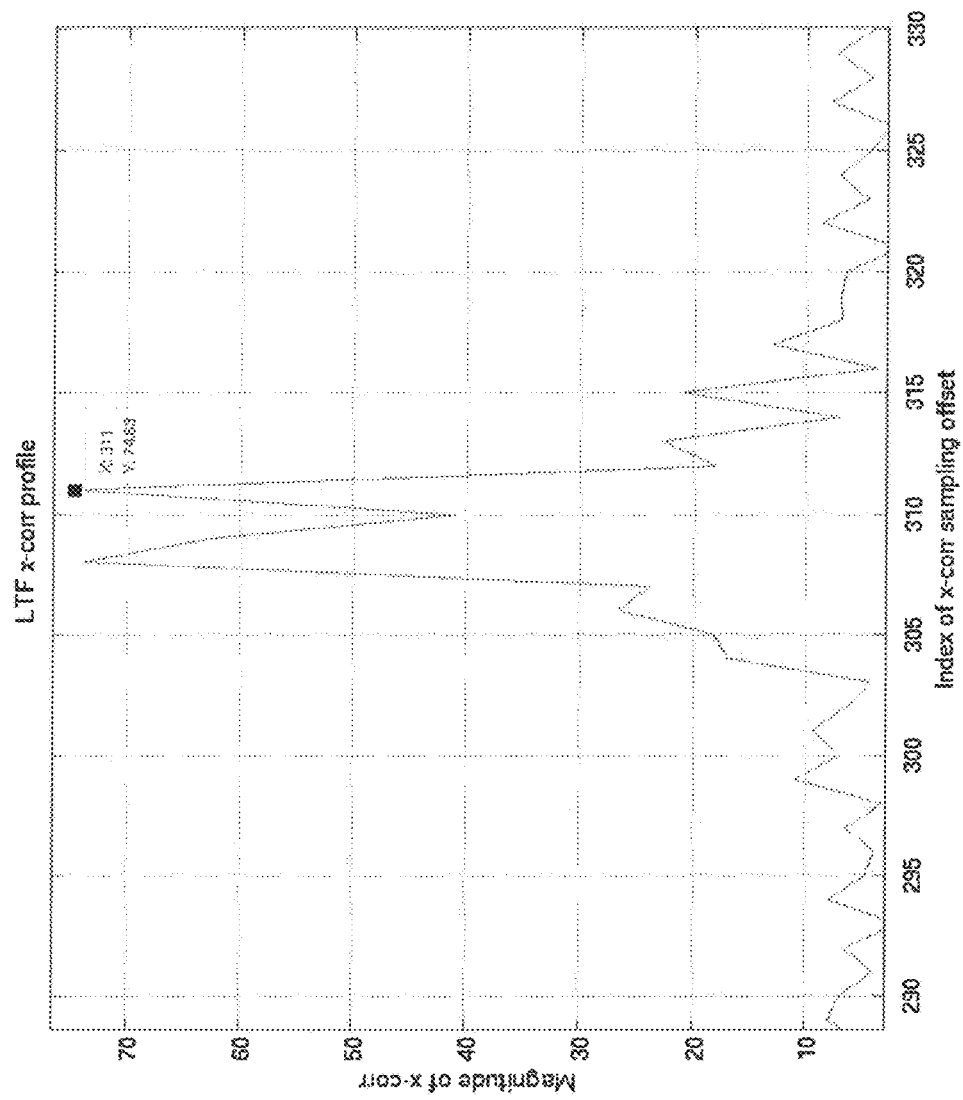
FIG. 9 illustrates an example of an LTF cross-correlation profile.

The bi-sect searching focuses on a local region (+/- sample duration) where the timing measure is with respect to the local peak around the initial search sample. Setting the initial search window around the strongest peak will result in a bias in the TOA (of the earliest path) estimation result under a multipath channel. This can be corrected if the initial search window is set around the earliest peak rather than the strongest peak as shown in FIG. 9. FIG. 9 is an LTF cross-correlation profile illustrating a non-earliest strongest peak.

The algorithm can be adjusted to find the earliest peak instead of the strongest peak when those two peaks are resolvable (depending on the delay between the two paths due to a Rayleigh limit). The resolvable local peak has zero for the first order differential. A zero crossing condition may be used on the discrete time signal (sign change from positive to negative in the adjacent sample position in the first order differential) as a detection metric. To avoid false detection, thresholding may also be performed using the strongest peak as reference (scaled down).

The below Equation 6 corresponds to a forward difference.

$$\delta_f(n)=x(n)-x(n-1) \quad \text{[Equation 6]}.$$

The below Equation 7 corresponds to a backward difference.

$$\delta_b(n)=x(n)-x(n+1) \quad \text{[Equation 7]}.$$

The LTF cross-correlation profile (magnitude) is denoted as x(n). The sample position will be selected as the initial bi-section search position if the conditions are satisfied as follows: i) $\delta_f(n) \geq 0$ and $\delta_b(n) \leq 0$; ii) $x(n) > \text{Thr\_sc} \cdot \max(x(n))$; and iii) $|n - \text{argmax } nx(n)| \leq W$, where W and THr_sc are configurable. As an example, the default settings could be W=3 and Thr_sc=0.45.

Figure 10:
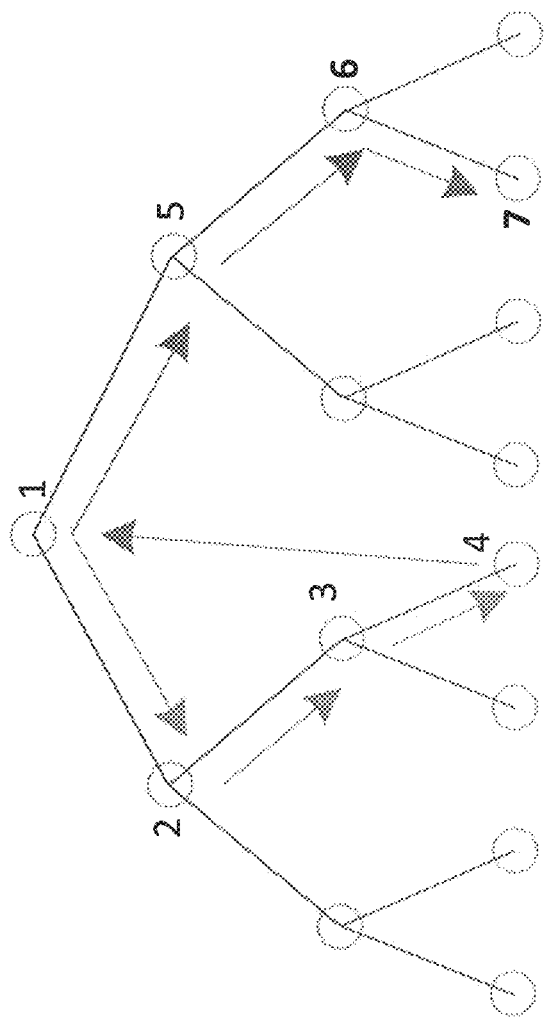
FIG. 10 illustrates a method of performing a b-section search according to an exemplary embodiment of the inventive concept.

The proposed bi-section search is not a recursive search. Hence it has a low complexity solution. However, the method could miss the genuine peak if the shape of the gradient of the two sides of the peak are very different. To avoid missing the peak, the algorithm can be improved to search the other half of the searching range if no greater value is found in a successive number of samples than the starting point. This is illustrated in FIG. 10. The number on each node indicates the order of visiting. The search starts on the left half of node 1. If all the visited nodes having strength no greater strength than node 1, the search will move to the nodes on the right hand side of the node 1 (e.g., nodes 5, 6, and 7).

The above-described methods may be tangibly embodied on one or more computer readable medium(s) (i.e., program storage devices such as a hard disk, magnetic floppy disk, RAM, ROM, CD ROM, Flash Memory, etc., and executable by any device or machine comprising suitable architecture, such as a general purpose digital computer having a processor, memory, and input/output interfaces).

Although the present inventive concept has been described in connection with exemplary embodiments thereof, those skilled in the art will appreciate that various modifications can be made to these embodiments without substantially departing from the principles of the present inventive concept.

What is claimed is:

1. A method of determining a time of arrival (ToA) of a wireless transmission, the method comprising:
   sampling, by a station, a signal received in a wireless transmission to generate first data in a time domain;
   performing, by the station, a fast Fourier transformation (FFT) on the first data to generate second data in a frequency domain;
   dividing, by the station, the second data by a reference signal to obtain a channel frequency response;
   performing, by the station, an inverse discrete Fourier transform (IDFT) on the channel frequency response to obtain a channel impulse response;
   determining, by the station, a peak in the channel impulse response; and
   determining, by the station, the ToA based on the peak,
   wherein the IDFT has P iterations, and an IDFT size of the IDFT is $2^P*N$, where the N is a number of samples of the channel frequency response, where P and N>=1.

2. The method of claim 1, wherein the signal is a transmitted legacy long training field (L-LTF).

3. The method of claim 1, wherein the second data is the channel frequency response multiplied by the reference signal, and the reference signal is a reference legacy long training field (L-LTF).

4. The method of claim 1, wherein determining the peak includes searching for a highest peak in the channel impulse response by searching $2^P*N$ results of the IDFT.

5. The method of claim 4, wherein the searching uses a bi-sect search method.

6. The method of claim 5, wherein the bi-sect search comprises:
   determining a local peak in the channel impulse response;
   comparing the local peak against amplitudes of two of the samples that are adjacent the local peak; and
   setting the highest peak based on a result of the comparing.

7. A station configured to determine a time of arrival (ToA) from a wireless transmission, the station comprising:
   a receiver configured to wirelessly receive the wireless transmission and a sample a signal received in the wireless transmission to generate first data in a time domain; and
   a digital signal processor (DSP) configured to perform a fast Fourier transformation (FFT) on the first data to generate second data in a frequency domain, divide the second data by a reference signal to obtain a channel frequency response, perform an inverse discrete Fourier transform (IDFT) on the channel frequency response to obtain a channel impulse response, determine a peak in the channel impulse response, and determine the ToA based on the peak,
   wherein the IDFT has P iterations, and an IDFT size of the IDFT is $2^P*N$, where the N is a number of samples of the channel frequency response, where P and N>=1.

8. The station of claim 7, wherein the signal includes a transmitted legacy long training field (L-LTF).

9. The station of claim 7, wherein the second data is the channel frequency response multiplied by the reference signal, and the reference signal includes a reference legacy long training field (L-LTF).

10. The station of claim 7, wherein the DSP determines the peak by searching for a highest peak in the channel impulse response by searching $2^P*N$ results of the IDFT.

11. The station of claim 10, wherein the searching uses a bi-sect search method.

12. The station of claim 11, wherein the bi-sect search comprises:
    determining a local peak in the channel impulse response;
    comparing the local peak against amplitudes of two of the samples that are adjacent the local peak; and
    setting the highest peak based on a result of the comparing.

13. A method of determining a location of a station, the method comprising:
    wirelessly transmitting, by the station, a first message;
    calculating, by the station, a channel frequency response from a second message wirelessly received in response to the first message;
    performing, by the station, an inverse discrete Fourier transform (IDFT) on the channel frequency response to obtain a channel impulse response;
    determining, by the station, a peak in the channel impulse response;
    determining, by the station, a first time of arrival (ToA) based on the peak; and
    determining, by the station, the location based on the first ToA, wherein the IDFT has P iterations, and an IDFT size of the IDFT is $2^P*N$, where the N is a number of samples of the channel frequency response, where P and N>=1.

14. The method of claim 13, wherein the determining of the location comprises:
   determining a distance based on a first departure time of the first message, a second departure time of the second message, the first ToA and a second TOA of the first message.

15. The method of claim 14, wherein the second departure time and the second TOA are included in the second message.

16. The method of claim 13, wherein the calculating comprises:
   sampling the first message to generate first data in a time domain;
   performing a fast Fourier transformation (FFT) on the first data to generate second data in a frequency domain; and
   dividing the second data by a reference signal to obtain the channel frequency response.

17. The method of claim 16, wherein the first message is a transmitted legacy long training field (L-LTF) and the reference signal is a reference legacy long training field (L-LTF).

* * * * *